(12) United States Patent
Ohashi et al.

(10) Patent No.: US 6,565,774 B2
(45) Date of Patent: May 20, 2003

(54) PASTE FOR FORMATION OF CERAMIC CAPACITOR ELECTRODE

(75) Inventors: Takashi Ohashi, Nagoya (JP); Minoru Ohara, Nagoya (JP); Kazunori Imai, Tokyo (JP)

(73) Assignees: NGK Insulators, Ltd., Nagoya (JP); Du Pont Kabushiki Kaisha, Meguro-ku (JP)

( * ) Notice: Subject to any disclaimer, the term of this patent is extended or adjusted under 35 U.S.C. 154(b) by 60 days.

(21) Appl. No.: 09/889,194

(22) PCT Filed: Dec. 22, 2000

(86) PCT No.: PCT/JP00/09117

§ 371 (c)(1),
(2), (4) Date: Jul. 12, 2001

(87) PCT Pub. No.: WO01/48762

PCT Pub. Date: Jul. 5, 2001

(65) Prior Publication Data

US 2003/0033956 A1 Feb. 20, 2003

(30) Foreign Application Priority Data

Dec. 24, 1999 (JP) .......................................... 11-368525

(51) Int. Cl.⁷ ............................................... H01B 1/22
(52) U.S. Cl. ..................................... 252/514; 106/1.21
(58) Field of Search ....................... 252/514; 106/1.21

(56) References Cited

U.S. PATENT DOCUMENTS 5,736,261 A * 4/1998 Kano .......................... 428/522
6,108,210 A * 8/2000 Chung ......................... 361/747

FOREIGN PATENT DOCUMENTS

| JP | 1-98674 | | 4/1989 |
| JP | 1-315903 | | 12/1989 |
| JP | 2-39411 | | 2/1990 |
| JP | 2-109314 | | 4/1990 |
| JP | 04129104 A | * | 4/1992 |
| JP | 10-88207 | | 4/1998 |
| JP | 10-92226 | | 4/1998 |

* cited by examiner

Primary Examiner—Mark Kopec
(74) Attorney, Agent, or Firm—Burr & Brown

(57) ABSTRACT

A paste for formation of ceramic capacitor electrode, composed of 10 to 14% by weight of an organic vehicle and 86 to 90% by weight of a platinum powder, wherein the platinum powder contains, in 100% by weight of the powder, 54 to 60% by weight of a spherical particle powder, 36 to 40% by weight of a flaky particle powder and 0 to 10% by weight of an indefinite particle powder. The electrode layer film of ceramic capacitor formed with the paste has a density, a surface roughness and an adhesion strength all of given values, can have improved adhesivity to the dielectric layer of the ceramic capacitor, and can make small the through holes generated in the electrode layer.

4 Claims, 4 Drawing Sheets

PASTE FOR FORMATION OF CERAMIC CAPACITOR ELECTRODE

TECHNICAL FIELD

The present invention relates to a paste for formation of a ceramic capacitor electrode.

BACKGROUND ART

Capacitors are an electronic part in which a dielectric layer placed between two electrode layers is allowed to have an electrostatic capacity. As shown in FIG. 1, a capacitor 1 has a structure in which two electrode layers 3 are placed on the upper and lower surfaces of a dielectric layer 2. In recent years, ceramic capacitors using a ceramic dielectric made of barium titanate ($BaTiO_3$) or the like have been used in order to impart heat resistance, corrosion resistance, etc. to a capacitor.

To meet a demand for smaller electric appliances, capacitors have become smaller as well. Nowadays, it is a general trend that such small ceramic capacitors use, as the electrode layer, a film formed with a paste and moreover, in order to achieve a small size and yet a large capacity, employ a laminated structure such as shown in FIG. 2.

Conventional ceramic capacitors, however, have been insufficient in adhesivity of electrode layer film to dielectric layer; therefore, they have had a problem of gradual peeling of electrode layer from dielectric layer upon use.

Peeling of electrode layer from dielectric layer results in formation of a gap between electrode layer and dielectric layer, and an air layer low in dielectric constant comes to be present in the gap. As a result, the capacity of the capacitor is deteriorated with time for the above reason, and the capacitor becomes unable to exhibit its intended function.

Also, conventional ceramic capacitors have, in some cases, through holes in the electrode layer. Owing to the difference in sizes of these through holes, the effective electrode area of capacitor (which determines the capacity of capacitor) varies between capacitors. As a result, the capacity of a capacitor differs greatly between capacitors and there has been an inconvenience of low yield of capacitor properties.

When a ceramic capacitor of laminated structure is produced, there are formed, on a dielectric layer (which later becomes one end of the laminated capacitor produced), electrode layers and dielectric layers by turns, followed by one-time firing of the resulting laminate. At this time, when each electrode layer interposed between two dielectric layers has through holes, the air present in the through holes and the gas generated during the firing expand in the holes during the firing and raise the internal pressures of the holes; as a result, interlayer peeling between dielectric layer and electrode layer takes place. Consequently the dielectric layers give rise to blistering and cracking, and also there has been a problem of a reduction in yield of ceramic capacitor produced. This problem can be solved by carrying out firing for a long time; however, such firing incurs increases in running cost and lead time, resulting in a higher production cost.

The present invention has been made in view of such a situation. The object of the present invention is to provide a paste for formation of a ceramic capacitor electrode, capable of forming an electrode layer of the ceramic capacitor which hardly peels from the dielectric layer of the capacitor and giving an increased capacitor yield in production of ceramic capacitor.

SUMMARY OF THE INVENTION

According to the present invention, there is provided a paste for formation of a ceramic capacitor electrode, composed of 10 to 14% by weight of an organic vehicle and 86 to 90% by weight of a platinum powder, wherein the platinum powder contains, in 100% by weight of the powder, 54 to 60% by weight of a spherical particle powder, 36 to 40% by weight of a flaky particle powder and 0 to 10% by weight of an indefinite particle powder.

BRIEF DESCRIPTION OF THE DRAWINGS

FIG. 3(a) is an enlarged photograph of 2,000 magnification by secondary electron microscope observation, and FIG. 3(b) is an enlarged photograph of 7,500 magnification by secondary electron microscope observation.

FIG. 4(a) is an enlarged photograph of 2,000 magnification by secondary electron microscope observation, and FIG. 4(b) is an enlarged photograph of 7,500 magnification by secondary electron microscope observation.

FIG. 5(a) is an enlarged photograph of 2,000 magnification by secondary electron microscope observation, and FIG. 5(b) is an enlarged photograph of 7,500 magnification by secondary electron microscope observation.

DETAILED DESCRIPTION OF THE INVENTION

Figure 1:
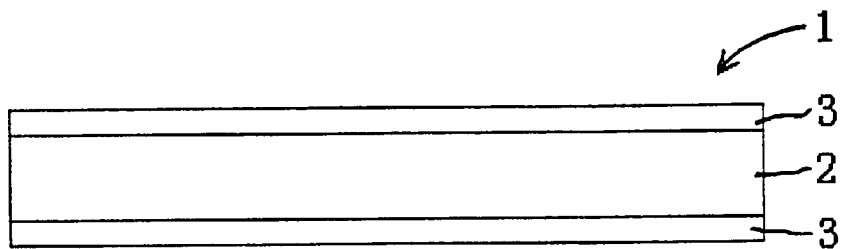
FIG. 1 is a schematic sectional view of a capacitor.
Figure 2:
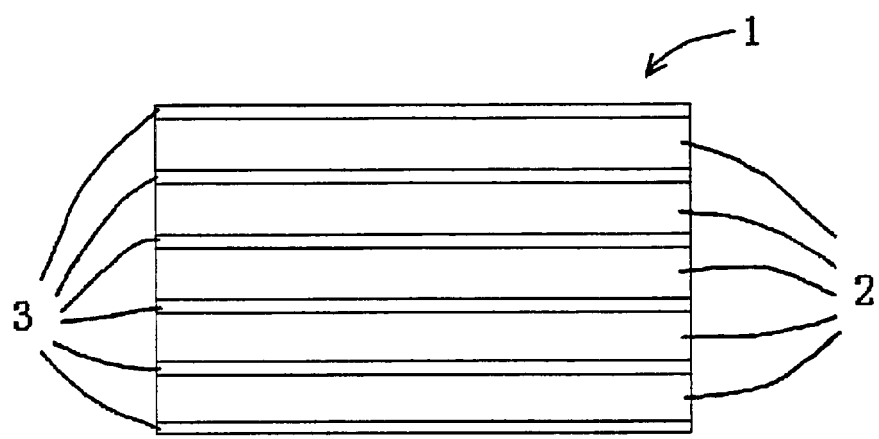
FIG. 2 is a schematic sectional view of a ceramic capacitor having a laminated structure.
Figure 3A:
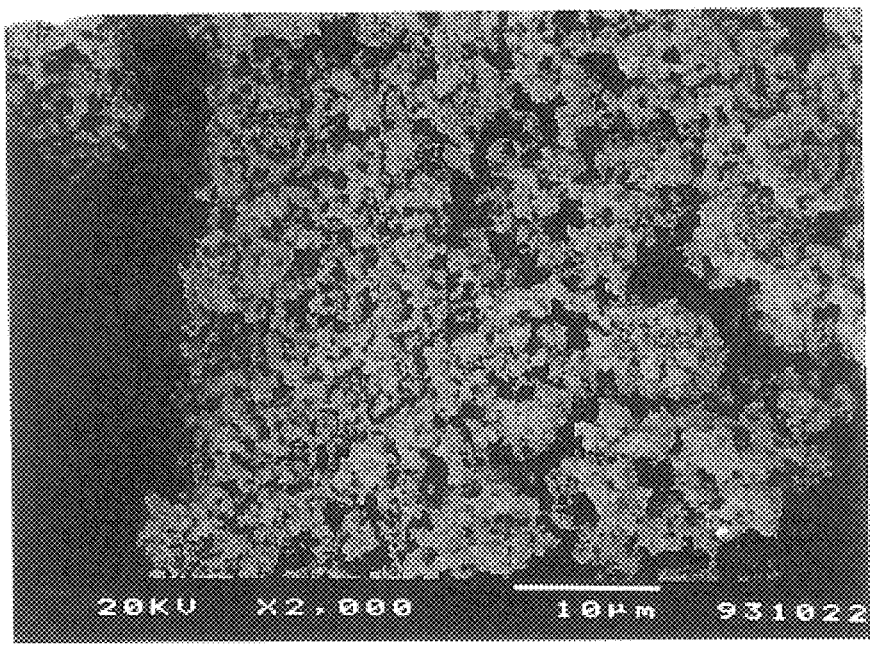
FIGS. 3(a) and 3(b) show an example of the particle structure of a spherical particle powder.
Figure 3B:
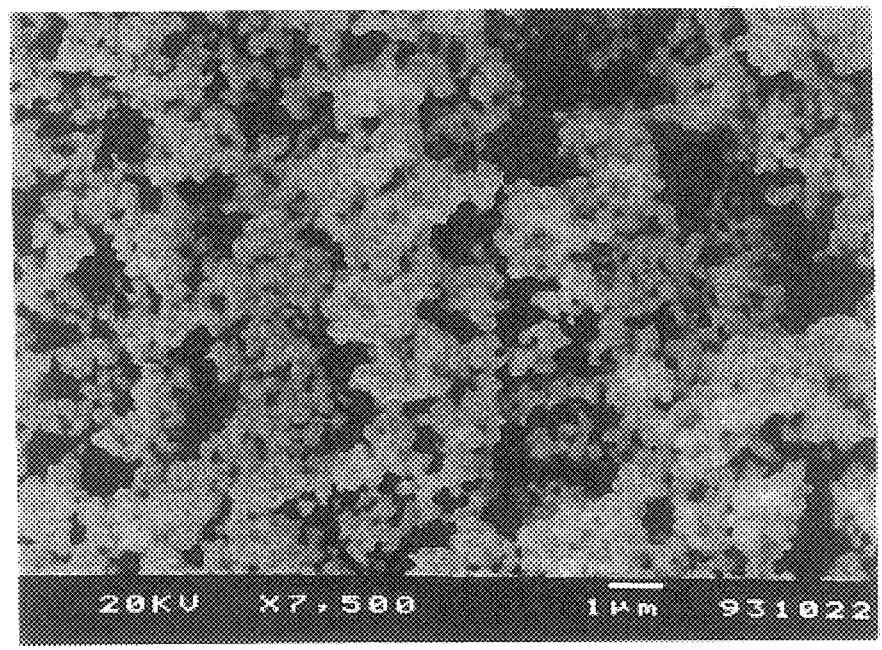
Figure 4A:
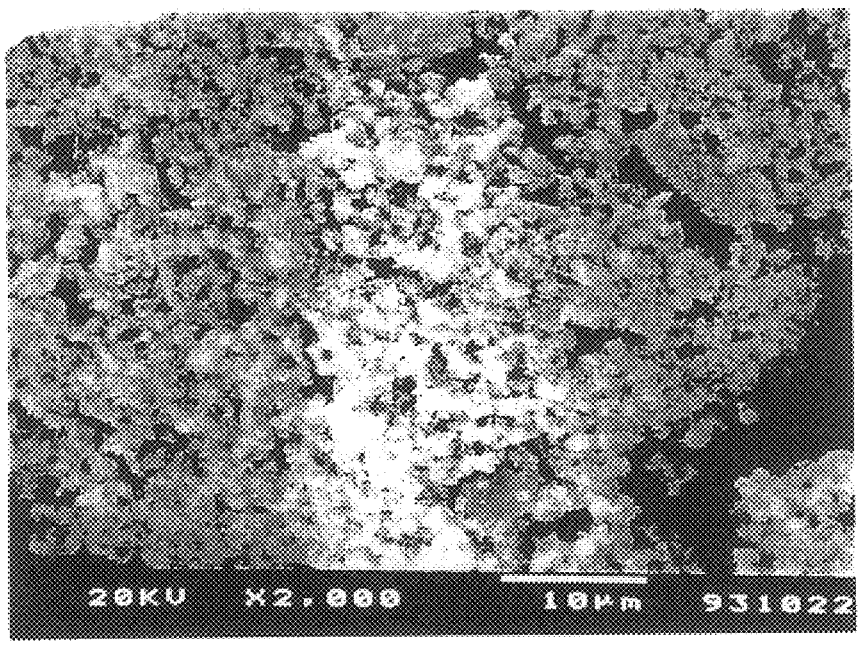
FIGS. 4(a) and 4(b) show an example of the particle structure of a flaky particle powder.
Figure 4B:
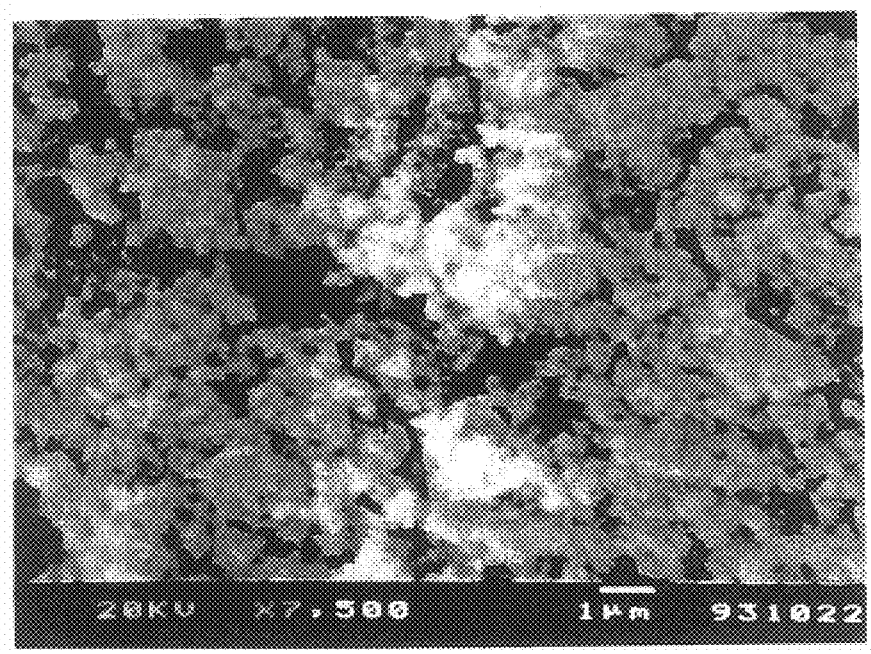
Figure 5A:
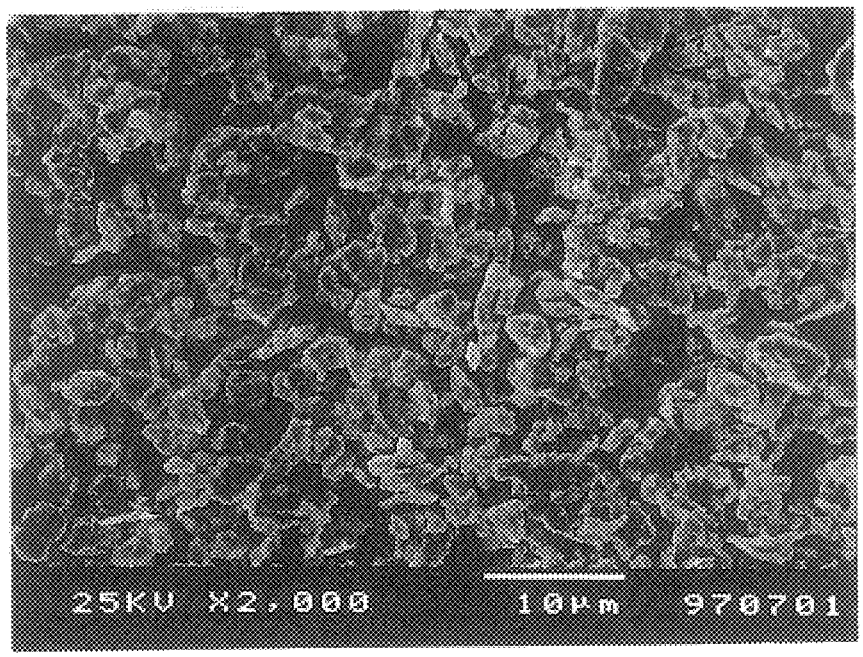
FIGS. 5(a) and 5(b) show an example of the particle structure of an indefinite particle powder.
Figure 5B:
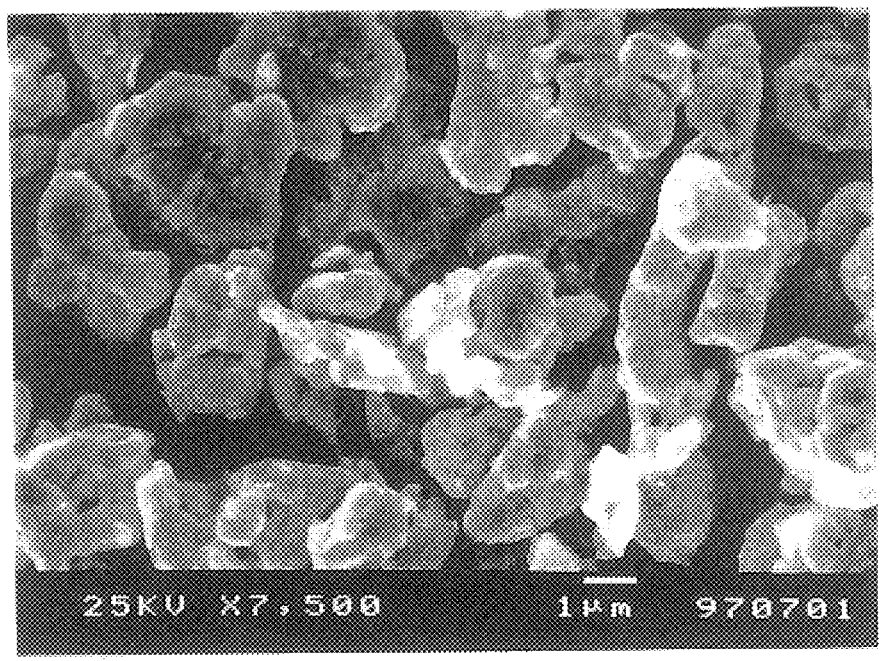

The paste for formation of electrode according to the present invention is composed of 10 to 14% by weight of an organic vehicle and 86 to 90% by weight of a platinum powder, wherein the platinum powder contains, in 100% by weight of the powder, 54 to 60% by weight of a spherical particle powder, 36 to 40% by weight of a flaky particle powder and 0 to 10% by weight of an indefinite particle powder.

The reason for specifying the content of the platinum powder in the paste for formation of electrode, at 86 to 90% by weight, is that when the content is less than 86% by weight, a reduction in film density takes place and, when the content is more than 90% by weight, deterioration in printability takes place. More preferably, the content of the platinum powder is 88 to 90% by weight and the content of the organic vehicle is 10 to 12% by weight.

The reason for specifying, in 100% by weight of the platinum powder, the proportion of the spherical particle powder at 54 to 60% by weight, the proportion of the flaky particle powder at 36 to 40% by weight and the proportion of the indefinite particle powder at 0 to 10% by weight, is to allow the formed electrode layer film of the capacitor to have a density of 80% or more, a surface roughness (Ra) of 0.4 to 0.6 μm and an adhesion strength of 2 kg or more.

When the film density is 80% or more, it is possible to suppress the deterioration of capacitor properties and the dispersion of capacitor capacity. Herein, "film density" is a concept indicating the compactness of electrode film, and refers to a value [(total electrode area–hole area)/(total electrode area)] obtained by taking photographs of an electrode surface at several different places using an electron microscope or a metallurgical microscope and calculating the hole area and the total electrode area. Therefore, a larger film density indicates that the through holes generated in the film formed on an electrode layer are smaller in size and number.

In the present invention, by specifying the proportions of the platinum powders of different particle shapes in given ranges, the film density is controlled, whereby the through holes are made small in size and number and the dispersion of capacitor capacity is made small. Also, the deterioration of capacitor properties can be suppressed. Incidentally, the reason why the film density becomes 80% or more by specifying the proportions of the platinum powders of different particle shapes in the above ranges, is that mixing of three kinds of powders different in particle shape in a good balance allows for a higher packing density of powder in paste and a smaller contraction during firing.

By setting the surface roughness (Ra) of the electrode layer film at 0.4 to 0.6 μm and the adhesion strength of the film at 2 kg or more, the adhesivity of the film to the dielectric layer can be enhanced and the peeling of the electrode layer from the dielectric layer can be made substantially nil. By specifying the surface roughness (Ra) of the film in the above range, the adhesivity of the film is increased with no reduction in film density; it is because in the laminated capacitor structure, the platinum adheres to the base material by a chemical bonding force brought about by diffusion of platinum into base material and also by a physical bonding force brought about by an anchor effect having a close relation with the surface roughness. Herein, "surface roughness (Ra)" is a value obtained by JIS B 0601. "Adhesion strength" is a concept indicating an adhesivity between base material and conductor, and refers to a tensile strength obtained when an L-shaped lead wire of 0.6 mm in diameter consisting of a tin-coated soft copper wire is attached to a 2 mm×2 mm conductor pattern by soldering and is pulled vertically at a tensile speed of 20 mm/sec. Incidentally, by specifying the proportions of the platinum powders of different particle shapes in the above ranges, the surface roughness (Ra) is controlled at 0.4 to 0.6 μm; the reason therefor is that the flaky particle powder of large particle diameters constitutes the skeleton of electrode layer, the spherical particle powder and the indefinite particle powder both having small particle diameters fill the gaps present between the skeleton, and thereby the surface roughness after firing is stabilized. The reason why the adhesion strength becomes 2 kg or more, is that the spherical particle powder and the indefinite particle powder both small in particle diameter are rich in surface activity and therefore can easily diffuse into the base material.

FIGS. 3(a) and 3(b), FIGS. 4(a) and 4(b) and FIGS. 5(a) and 5(b) show photographs of a spherical particle powder, a flaky particle powder and an indefinite particle powder, respectively, by secondary electron microscope observation. The spherical particle power is a powder of substantially spherical particles having diameters of submicron order; the flaky particle powder is a powder of flat particles whose major diameters are a micron order; and the indefinite particle diameter is a powder whose primary particles have diameters of Å order, and large particles seen at some places are secondary particles formed by agglomeration of primary particles.

As described above, in the paste for formation of electrode according to the present invention, the proportions of the platinum powders of different particle shapes constituting the paste are specified in given ranges; thereby, the electrode layer film made from the paste has a controlled density, a controlled surface roughness (Ra) and a controlled adhesion strength; this makes small the dispersion of capacitor capacity and prevents the deterioration of capacitor properties.

In the platinum powder constituting the present paste for formation of electrode, the proportions of the spherical particle powder, the flaky particle powder and the indefinite particle powder are more preferably 57 to 60% by weight, 38 to 40% by weight and 0 to 5% by weight, respectively.

The present invention is described in more detail below by way of Examples. However, the present invention is in no way restricted by the Examples.

EXAMPLE 1

There were compounded 12% by weight of an organic vehicle and 88% by weight of a platinum powder (which consisted of 57% by weight of a spherical particle powder, 38% by weight of a flaky particle powder and 5% by weight of an indefinite particle powder), to obtain a paste for electrode. The paste was applied to the upper and lower sides of a dielectric layer to form electrode layers, followed by firing, to produce a ceramic capacitor as shown in FIG. 1.

The lower electrode film of the capacitor had a density of 88%, a surface roughness (Ra) of 0.45 μm and an adhesion strength of 2.4 kg.

In the above ceramic capacitor, the dielectric layer was constituted by lead zirconate titanate and had a thickness of 20 μm. The electrode layers had a thickness of 4 μm.

25 such capacitors were measured for capacity and dispersion of capacity. Further, they were put in continuous operation for 1,000 hours and then measured for peeling of electrode layer from dielectric layer. The results are shown in Table 1.

EXAMPLES 2 to 9

A ceramic capacitor was produced in the same manner as in Example 1. By using a compounding ratio of platinum powder and organic vehicle in paste for electrode and proportions of platinum powders of different particle shapes, all shown in Table 1, the lower electrode film of the ceramic capacitor was allowed to have a density, a surface roughness (Ra) and an adhesion strength, all shown in Table 1.

25 such capacitors were measured for capacity and dispersion of capacity. Further, they were measured for peeling of electrode layer from dielectric layer in the same manner as in Example 1. The results are shown in Table 1.

Comparative Example 1

There were compounded 16% by weight of an organic vehicle and 84% by weight of the same platinum powder as used in Example 1 (which consisted of 35.7% by weight of a spherical particle powder, 40.5% by weight of a flaky particle powder and 23.8% by weight of an indefinite particle powder), to obtain a paste for electrode. Using the paste was produced the same ceramic capacitor as in Example 1. The lower electrode film of the capacitor had a density of 70%, a surface roughness (Ra) of 0.63 µm and an adhesion strength of 1.5 kg.

25 such capacitors were measured for capacity and dispersion of capacity. Further, they were measured for peeling of electrode layer from dielectric layer in the same manner as in Example 1. The results are shown in Table 1.

Comparative Examples 2 to 5

A ceramic capacitor was produced in the same manner as in Example 1. By using a compounding ratio of platinum powder and organic vehicle in paste for electrode and proportions of platinum powders of different particle shapes, all shown in Table 1, the lower electrode film of the ceramic capacitor was allowed to have a density, a surface roughness (Ra) and an adhesion strength, all shown in Table 1.

25 such capacitors were measured for capacity and dispersion of capacity. Further, they were measured for peeling of electrode layer from dielectric layer in the same manner as in Example 1. The results are shown in Table 1. As to the capacitor of Comparative Example 2, the film caused curling, making it impossible to measure the density of film or the capacity of capacitor.

roughness (Ra) and adhesion strength of the film, at given values, the peeling of the electrode layer from the dielectric layer of the capacitor and the blistering of the dielectric layer can be prevented.

Industrial Applicability

In the paste for formation of electrode according to the present invention, the proportions of the platinum powders of different particle shapes contained in the paste are specified in given ranges. Therefore, in the ceramic capacitor produced using the paste, the electrode layer film has a density, a surface roughness (Ra) and an adhesion strength all specified at given values; the adhesivity of the electrode layer to the dielectric layer can be improved; and the through holes generated in the electrode layer can be made small.

As a result, the peeling of the electrode layer from the dielectric layer and the deterioration of capacitor properties due to the presence of through holes can be prevented; and the yield in capacitor production can be improved via the suppression of dispersion of capacity.

What is claimed is:

1. A paste for formation of a ceramic capacitor electrode, composed of 10 to 14% by weight of an organic vehicle and 86 to 90% by weight of a platinum powder, wherein the platinum powder contains, in 100% by weight of the powder, 54 to 60% by weight of a spherical particle powder, 36 to 40% by weight of a flaky particle powder and 0 to 10% by weight of an indefinite particle powder.

2. A paste for formation of a ceramic capacitor electrode according to claim 1, composed of 10 to 12% by weight of the organic vehicle and 88 to 90% by weight of the platinum powder.

3. A paste for formation of a ceramic capacitor electrode according to claim 1, wherein the platinum powder contains, in 100% by weight of the powder, 57 to 60% by weight of the spherical particle powder, 38 to 40% by weight of the flaky particle powder and 0 to 5% by weight of the indefinite particle powder.

TABLE 1

| | Composition of paste for electrode (wt. %) | | | | | Properties of electrode layer film | | | | | | |
|---|---|---|---|---|---|---|---|---|---|---|---|---|
| | | | Ratio of platinum powders (%) | | | Film density | Surface roughness | Adhesion strength | Capacity | | | |
| | Platinum | Organic vehicle | Spherical | Flaky | Indefinite | (%) | (Ra) (µm) | (kg) | Average (pF) | Dispersion (pF) | Peeling | Blistering |
| Ex. 1 | 88 | 12 | 57 | 38 | 5 | 88 | 0.45 | 2.4 | 533 | 19 | No | No |
| Ex. 2 | 88 | 12 | 60 | 40 | 0 | 87 | 0.41 | 2.4 | 527 | 24 | No | No |
| Ex. 3 | 88 | 12 | 54 | 36 | 10 | 85 | 0.47 | 2.4 | 536 | 27 | No | No |
| Ex. 4 | 90 | 10 | 60 | 40 | 0 | 90 | 0.40 | 2.6 | 550 | 20 | No | No |
| Ex. 5 | 90 | 10 | 57 | 38 | 5 | 93 | 0.40 | 3.0 | 557 | 23 | No | No |
| Ex. 6 | 90 | 10 | 54 | 36 | 10 | 86 | 0.44 | 2.8 | 530 | 27 | No | No |
| Ex. 7 | 86 | 14 | 60 | 40 | 0 | 83 | 0.50 | 2.4 | 520 | 30 | No | No |
| Ex. 8 | 86 | 14 | 57 | 38 | 5 | 84 | 0.54 | 2.5 | 519 | 29 | No | No |
| Ex. 9 | 86 | 14 | 54 | 36 | 10 | 81 | 0.56 | 2.3 | 512 | 35 | No | No |
| Com. Ex. 1 | 84 | 16 | 35.7 | 40.5 | 23.8 | 70 | 0.63 | 1.5 | 489 | 50 | Yes | Yes |
| Com. Ex. 2 | 88 | 12 | 70 | 30 | 0 | Unmeasurable | 0.47 | 3.2 | — | — | Yes | |
| Com. Ex. 3 | 86 | 14 | 35.7 | 40.5 | 23.8 | 75 | 0.58 | 1.9 | 494 | 43 | No | Yes |
| Com. Ex. 4 | 88 | 12 | 100 | 0 | 0 | 76 | 0.20 | 3.5 | 478 | 48 | Yes | Yes |
| Com. Ex. 5 | 88 | 12 | 0 | 100 | 0 | 72 | 0.72 | 1.0 | 442 | 59 | Yes | Yes |

As is clear from the comparison of Examples with Comparative Examples, by specifying the compounding ratio of the platinum powder and organic vehicle constituting an electrode layer film of capacitor and the density, surface

4. A paste for formation of a ceramic capacitor electrode according to claim 1, capable of forming an electrode layer film of the ceramic capacitor having a density of 80% or more, a surface roughness (Ra) of 0.4 to 0.6 $\mu$m and an adhesion strength of 2 kg or more.

* * * * *